United States Patent (10) Patent No.: US 6,654,163 B1
Du et al. (45) Date of Patent: Nov. 25, 2003

(54) OPTICAL AMPLIFIER ARRANGEMENT FOR A SOLID STATE LASER

(75) Inventors: Keming Du, Aachen (DE); Peter Loosen, Aachen-Kornelimuenster (DE); Reinhart Poprawe, Aachen (DE)

(73) Assignee: Fraunhofer-Gesellschaft zur Foerderung der angewandten, Munich (DE)

( * ) Notice: Subject to any disclaimer, the term of this patent is extended or adjusted under 35 U.S.C. 154(b) by 0 days.

(21) Appl. No.: 09/980,521

(22) PCT Filed: May 31, 2000

(86) PCT No.: PCT/EP00/04998
§ 371 (c)(1),
(2), (4) Date: Apr. 18, 2002

(87) PCT Pub. No.: WO00/74185
PCT Pub. Date: Dec. 7, 2000

(30) Foreign Application Priority Data

Jun. 1, 1999 (DE) .......................... 199 25 258
May 25, 2000 (DE) .......................... 100 25 874

(51) Int. Cl.[7] .............................. H01S 3/08; H01S 3/09
(52) U.S. Cl. .......................... 359/347; 359/346; 372/95
(58) Field of Search ........................ 359/337, 346, 359/347; 372/661, 671, 93, 95

(56) References Cited

U.S. PATENT DOCUMENTS

| | | | | |
|---|---|---|---|---|
| 4,119,928 A | * | 10/1978 | Michon et al. ............. 359/347 |
| 4,783,789 A | * | 11/1988 | Higgins ....................... 372/97 |
| 5,021,742 A | | 6/1991 | Jacob | |
| 5,327,449 A | * | 7/1994 | Du et al. ...................... 372/97 |
| 5,386,431 A | * | 1/1995 | Tulip ........................... 372/68 |
| 5,392,310 A | * | 2/1995 | Klein ........................... 372/95 |
| 5,428,635 A | * | 6/1995 | Zhiglinsky et al. ........... 372/92 |
| 5,848,091 A | * | 12/1998 | Caristan ...................... 372/99 |
| 6,256,332 B1 | | 7/2001 | Anikitchev | |

FOREIGN PATENT DOCUMENTS

DE   19609851   7/2001
EP    0572201  12/1993

* cited by examiner

*Primary Examiner*—Nelson Moskowitz
(74) *Attorney, Agent, or Firm*—Crowell & Moring LLP

(57) ABSTRACT

An optical amplifier arrangement, including an amplifying medium, which exhibits an approximately rectangular cross section with a long edge and a short edge, as well as at least two highly reflecting mirrors, between which the amplifying medium is disposed, whereby the long or the short edge of the cross section is along the X axis or the Y axis; the Z axis is the optical axis; and the X, Y and Z axis form a rectangular coordinate system. The mirrors are designed and arranged in such a manner that one beam, which is to be amplified and beamed in by an oscillator, passes repeatedly through the amplifying medium in the XZ plane and is amplified; and the size of the beam to be amplified in the X direction becomes larger after each passage.

42 Claims, 4 Drawing Sheets

OPTICAL AMPLIFIER ARRANGEMENT FOR A SOLID STATE LASER

BACKGROUND OF THE INVENTION

The present invention relates to an optical amplifier apparatus that is suited, in particular, for amplifying at a high amplification factor a laser beam emitted from a laser source or from an oscillator.

The achievable laser output power, in particular of solid-state lasers, is generally limited with regard to high beam quality by the thermal lens effect of the amplifying medium. An oscillator-amplifier apparatus has been in use to date to achieve high laser performance accompanied by high beam quality. The oscillator is arranged in such a way that it emits a laser beam of high quality at relatively low power. Subsequently, the laser beam, which is emitted by the oscillator, is irradiated into the amplifier (connected in series) and amplified, resulting in high beam power while maintaining the beam quality.

An apparatus of this type, including an amplifier connected in series, is shown e.g. in FIG. 6, wherein the reference symbol 1 denotes an optical amplifier, reference symbol 13 denotes an oscillator and reference symbol 14 denotes the optical components that serve to realize the optical imaging.

The apparatus represented in FIG. 6 is a laser apparatus in which both the oscillator and the amplifier have a rod-shaped solid-state medium. Based on the available amplification, which is limited ultimately because of increased spontaneous emission and parasitic oscillation, the typical amplification factor for an amplifier of this kind is approximately 1.2 to 3 per run.

In weak oscillators, this amplification factor is often too minimal to achieve an efficient utilization of the amplification medium.

One possibility for solving this problem is a regenerative amplifier apparatus where the amplification medium is integrated in a resonator with a Pockels cell and a polarizer (regenerative resonator). The laser beam that is to be amplified is injected in the regenerative resonator through the Pockels cell and the polarizer. After several runs through the amplifier medium, the laser beam is amplified several times, and in the end it is coupled out of the resonator via the Pockels cell and the polarizer. Even though this method produces an efficient amplification, the described realization is very complex and is applicable only to a limited degree for laser pulses that are shorter than several 10 ps.

To further increase the laser performance several amplification steps can be used. Multi-step amplifier apparatuses of this kind always come at a high cost. Moreover, they are very voluminous, need much space and are not very reliable.

To improve the amplification factor, the U.S. Pat. No. 4,703,491 discloses a laser apparatus with a partially permeable feed-out mirror and a fully reflective folding mirror on the one side of the active laser medium and another fully reflective folding mirror on the other side of the active laser medium. The optical system is arranged in such a way that a laser beam passes through an active laser medium several times resulting in a long, effective resonator length. In this apparatus, the beam returns on to itself after multiple folding or multi-pass.

Furthermore, German patent document DE-A-196 09 851 describes a micro-strip laser with an almost fully reflective end mirror and a partially reflecting feed-out mirror that are arranged, respectively, on different sides of the active laser medium, and two folding mirrors that are inclined in the direction of the face sides of the resonator on both sides of the laser medium. This apparatus realizes a multi-pass resonator. As shown in particular in FIG. 3, one of the folding mirrors has a mirror surface with a concave curvature, which expands the cross-section of the laser beam in one pass-through direction. In the reverse pass-through direction, however, the cross-section of the laser beam is once again reduced. This leads to increased stress being placed on the optical components within the resonator. In fact, when passing from the feed-out mirror to the fully reflective end mirror, the power density drastically increases because the cross-section of the beam is becoming smaller. This not beneficial for the effective utilization of the amplifier medium and in terms of the stress on the optical components.

SUMMARY OF THE INVENTION

It is therefore an object of the present invention to provide an optical amplifier apparatus that eliminates the disadvantages of the state of the art.

This and other objects and advantages are achieved by the optical amplifier according to the invention, which includes an amplifier medium that has approximately a rectangular cross-section, with a long edge and a short edge, and at least two highly reflective mirrors. The amplifying medium is arranged between the latter mirrors, with the long edge or short edge of the cross-section disposed along the x-axis or the y-axis, and the z-axis being the optical axis. (The x-, y- and z-axes constitute a rectangular system of coordinates.) The mirrors are designed and arranged in such a manner that a beam injected by an oscillator into the xz-plane, which is to be amplified, passes through the amplifying medium several times and is amplified, while the dimension of the beam, that is to be amplified, expands in the x-direction after each pass-through.

Other objects, advantages and novel features of the present invention will become apparent from the following detailed description of the invention when considered in conjunction with the accompanying drawings.

DETAILED DESCRIPTION OF THE INVENTION

The elements of the optical amplifier apparatus according to the present invention are a rod-shaped amplification medium and two specially designed and arranged highly reflective mirrors, the amplification medium being arranged between the latter. The advantages of the rod-shaped amplification medium reside in its quasi one-dimensional heat conduction and an one-dimensional lens effect representing minimal loss due to depolarization for a solid-state medium.

Figure 1A:
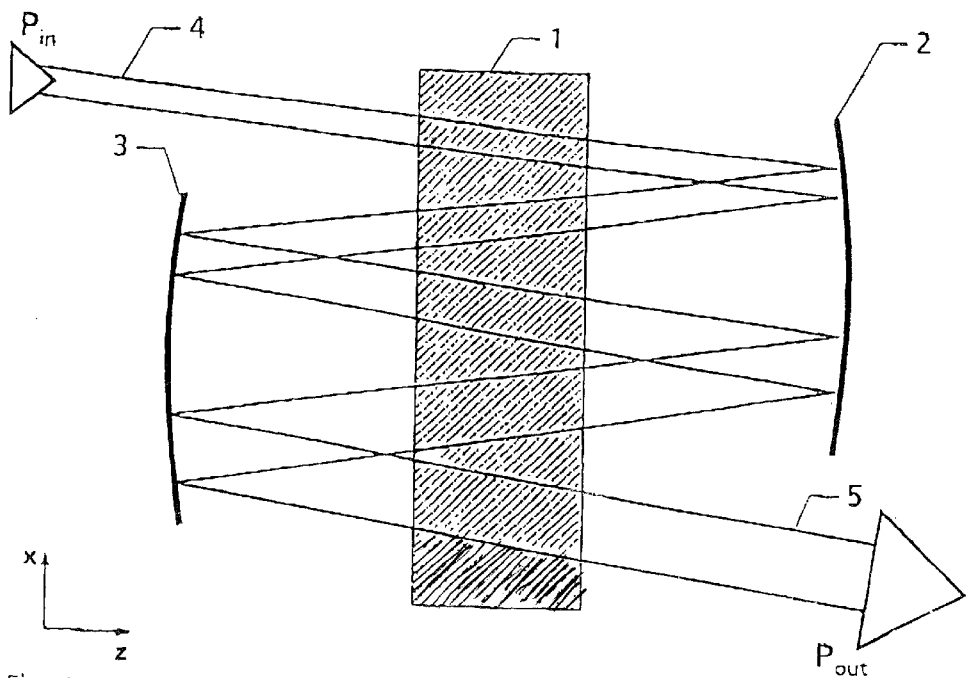
FIG. 1a is a cross-section in the xz-plane of a first embodiment of the present invention.
Figure 1B:
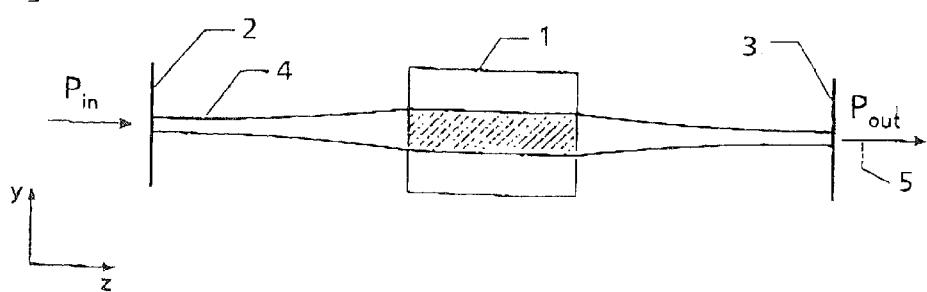
FIG. 1b is a cross-section in the yz-plane of a first embodiment of the present invention.
Figure 1C:
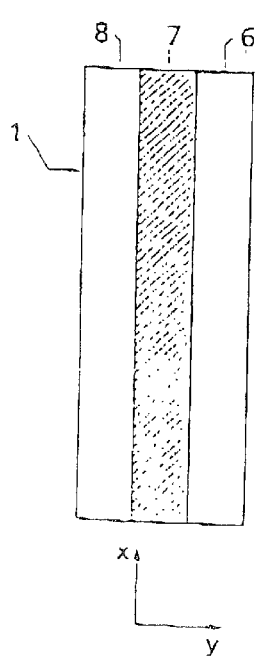
FIG. 1c is a cross-section of the amplification medium in the xy-plane.

In FIGS. 1a–1c, the amplification medium with an approximately rectangular cross-section is arranged between at least two highly reflective mirrors 2, 3. (A rectangular system of coordinates is introduced to simplify the representation.) The x-axis or y-axis is parallel to the long edge or short edge of the cross-section, and the z-axis is parallel to the optical axis. An oscillator (not shown) emits a laser beam with high beam quality and relatively minimal power. The beam 4 from the oscillator (input beam) that is to be amplified is injected essentially parallel in relation to the optical axis into the amplification medium 1. If the two mirrors are suitably dimensioned, the beam passes multiple times back and forth, principally through the xz-plane, between the mirrors and through the amplification medium 1. This arrangement ensures that, on the one hand, the high beam quality of the amplified beam is not compromised and, on the other hand, that a high amplification factor is realized.

In accordance with the present invention, the optical amplification apparatus, preferably the two mirrors, is designed in such a way that the dimension of the output beam becomes larger in the x-direction than the dimension of the input beam. During amplification of the beam that is passing through, this will allow for achieving an approximately even power density.

The above is advantageous with regard to the saturation behavior of the amplification and for reducing the intensity with regard to the optical components, in particular the amplification medium.

In fact, efficient operation of the amplifier presupposes that the laser intensity is comparable with the saturation intensity of the laser medium. This means that if the laser performance increases, the cross-section of the laser beam must be expanded correspondingly. The most effective utilization of the amplification is accomplished when the dimension of the beam expands in the x-direction after each pass-through, preferably at a constant factor M.

The factor M is a function of the small signal gain and of the intensity of the input beam in relation to the saturation intensity. For the amplification of the cw- and/or qcw-lasers the factor M is represented by:

$$M \approx 1 + (I_s/I_{in}) \cdot gol$$

wherein $I_{in}$ denotes the intensity of the input beam, $I_s$ the saturation intensity of the amplification medium and gol the total small signal gain per run.

For a pulsed laser the optimum factor M is represented as:

$$M \approx 1 + (E_s/E_{in}) \cdot gol$$

wherein $E_{in}$ denotes the energy flow density of the input beam, $E_s$ the saturation energy flow density of the amplification medium and goe the total small signal gain per run.

Figure 2:
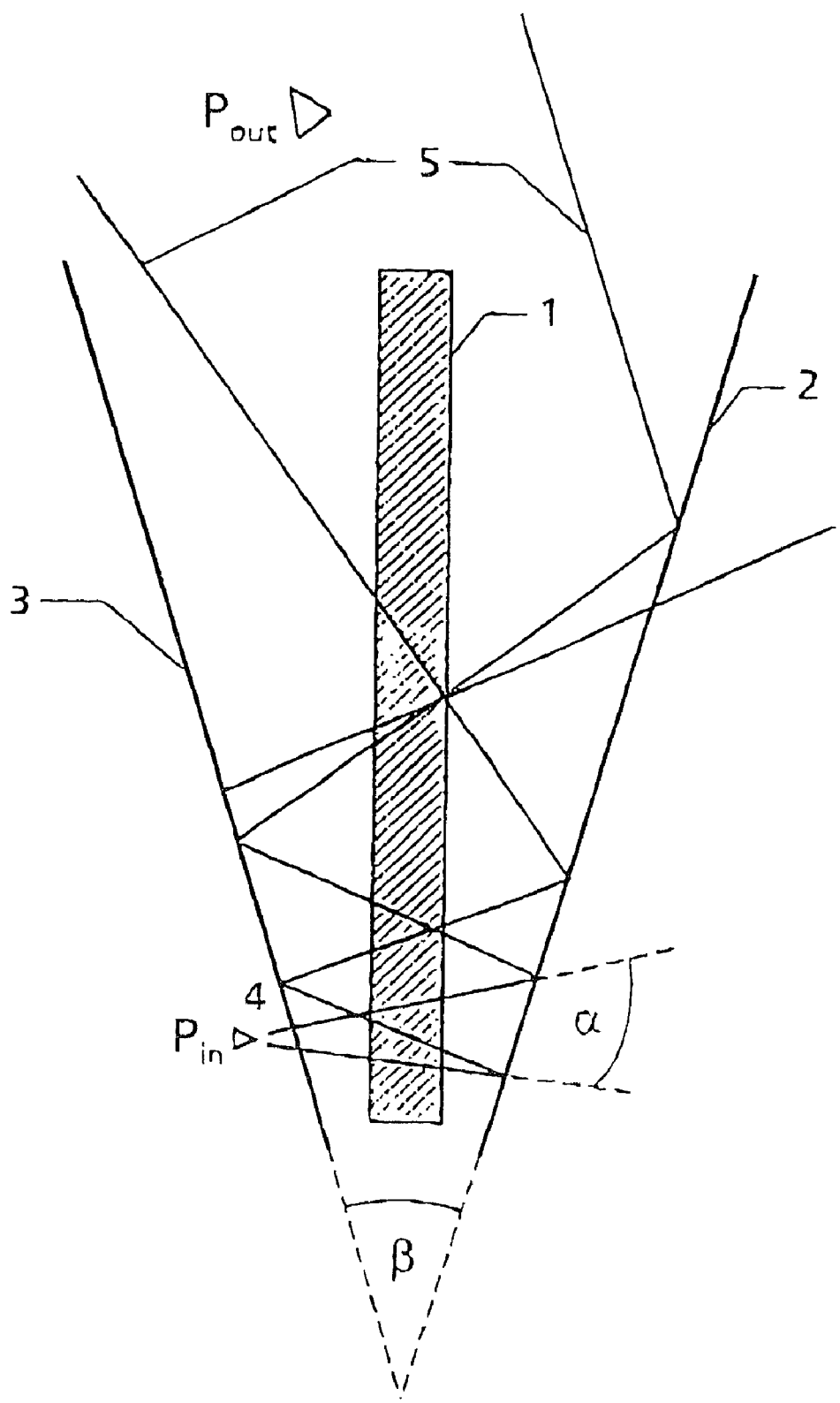
FIG. 2 is the schematic expansion of the beam that is to be amplified in accordance with a second embodiment of the invention.

A particularly simple amplification apparatus is depicted in FIG. 2. It is realized with two planar mirrors, which are arranged at an angle β relative to each other that is approximately equal to the full divergence angle α of the input beam. For efficient amplification, the angle α is defined principally by the small signal gain, the saturation intensity, the power of the input beam and the distance between the two mirrors.

Figure 3A:
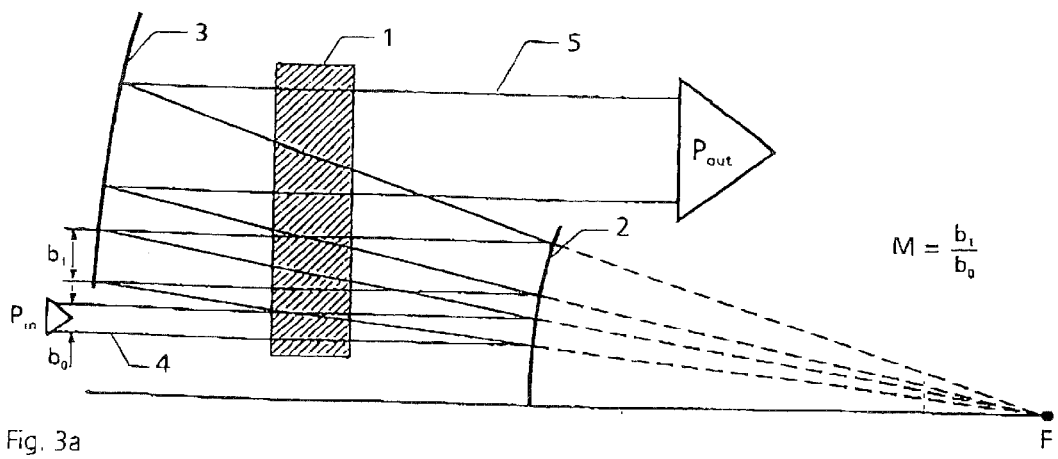
FIG. 3a shows a cross-section in the xz-plane of a third embodiment of the present invention.

Another preferred embodied example is shown in FIG. 3a. In this embodied example the two mirrors 2, 3 are designed and arranged in such a way that they form a type of hybrid resonator that is unstable in the xz-plane and stable in the yz-plane. The input beam 4 is injected in the resonator off axis.

To stabilize the optical resonator in the yz-plane it is possible to use one or several cylindrical lens(es).

In this embodiment the two mirrors 2, 3 are realized cylindrically with curvatures in the xy-plane. It should be noted that this embodiment can also be realized in a more general optical amplifier apparatus with the dimension of the beam that is to be amplified expanding in the x-direction; but it does not expand after each pass-through. The resonator is stable in the yz-plane due to the thermal lens effect.

It is advantageous that this embodiment needs fewer optical components, which reduces the adjustment effort for the optical amplifier apparatus.

Furthermore, it is advantageous if the amplification medium has a wave-guiding function at least in the y-direction.

In particular, simple beam paths can be realized in a confocal unstable resonator. As represented in FIG. 3a, in this resonator the focal points of the two mirrors 2, 3 are coincident at a point F. To avoid any possible destruction of optical components, it is advantageous to place the joint focus at a location outside of the resonator.

Figure 3B:
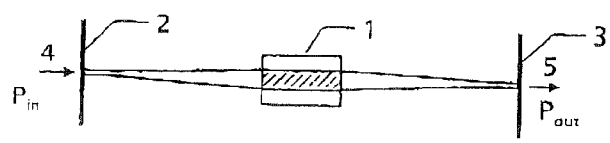
FIG. 3b shows a cross-section in the yz-plane of a third embodiment of the present invention.

A constant dimension of the beam within the amplification medium 1 in the y-direction is advantageous with regard to efficiency and beam quality. This can be achieved if the radius and position of the beam waist of the input beam 4 is adjusted to the transversal modes of the stable resonator. If both mirrors are straight in the y-direction, the beam waist of the input beam 4 is to be at the position of the mirror 2 that points toward the oscillator. Taking into consideration the lens effect of the amplification medium 1, the radius of the beam waist in the yz-plane is defined in such a way that, subsequent to the passage through the amplification medium in the yz-plane, another beam waist is created at the position of the mirror 3 that points away from the oscillator, as illustrated in FIG. 3b.

By placing the beam waist of the input beam in the xz-plane on the joint focus F of the two mirrors 2, 3 it is possible to realize a kind of lens conduction with a constant expansion in the xz-plane.

In total, amplification factors of between 10 and 1000 are achieved with the optical amplification apparatus according to the invention.

All laser-suitable media such as e.g. gas, excimer, semiconductor or solid-state media in which the population inversion takes place, respectively, by way of gas discharge, current injection or optical pumping, are suitable for use as the amplification media.

Figure 4:
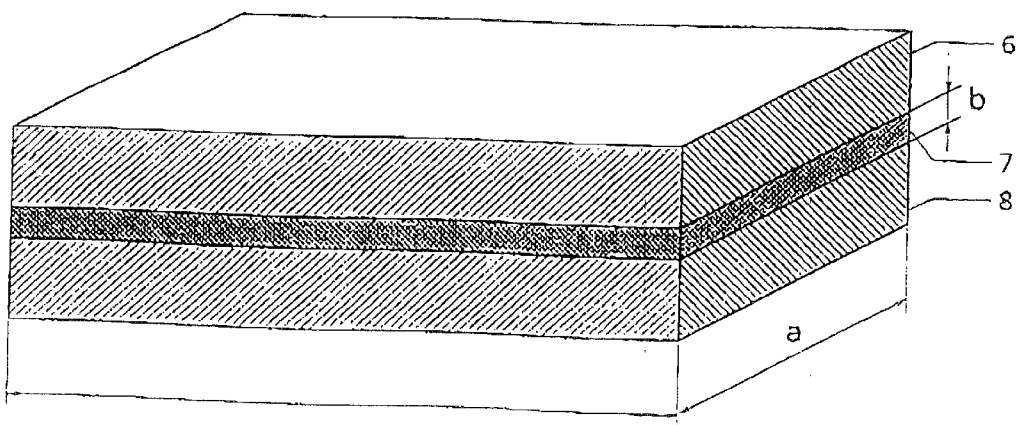
FIG. 4 shows a solid-state amplification medium that has a doped medium area and two undoped edge areas in the y-direction.

If a solid-state medium is used for the optical amplifier apparatus according to the invention, it is advantageous, in terms of its thermal behavior, to use a sandwich structure in the y-direction and/or in the z-direction. And the solid-state has in the y-direction and/or in the z-direction at least one doped medium area 7 and two undoped edge areas 6, 8, as shown in FIG. 4.

The solid-state medium can then be pumped optically, for example, using a diode laser radiation. When pumping, it is of fundamental importance to realize the pumping apparatus in such a way that a homogeneous pumping performance is realized in the xy-plane.

Figure 5:
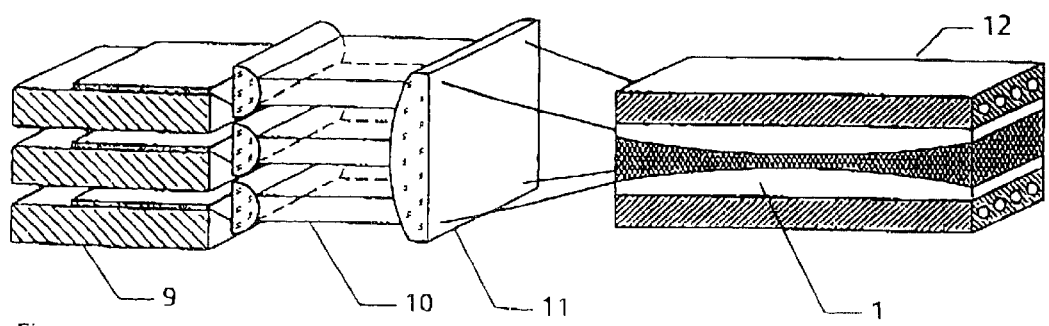
FIG. 5 shows an amplifier apparatus in accordance with another embodied example of the present invention.
Figure 6:
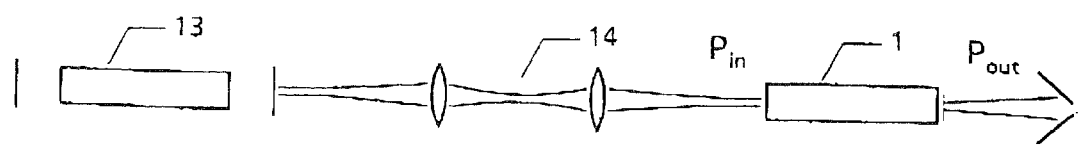
FIG. 6 shows a conventional amplifier apparatus.

FIG. 5 shows another embodiment of the present invention, in which this a solid-state amplification medium is pumped through a diode laser apparatus 9. In the interest of simplicity, the highly reflective mirrors 2, 3 and the baser beam 4 that is emitted by the oscillator and is to be amplified, are not shown in FIG. 5. But they can be arranged as shown in FIGS. 1a, 2 and 3a.

As seen in FIG. 5, the pump radiation that is emitted from the diode-laser apparatus 9 is coupled in the amplification medium 1 at least through one of the end surfaces and principally parallel in relation to the z-direction. The diode-laser apparatus 9 is realized in such a way that a flat pumped channel with a rectangular cross-section results in the amplification medium 1, whose dimension in the y-direction is smaller than that of the amplification medium. This pump apparatus is advantageous due to its improved thermal properties, and it offers fewer opportunities for parasitic oscillation.

If a solid-state medium is used as amplification medium 1, the contact cooling 12 effected through the two large surfaces that are parallel in relation to the xz-plane, ensures that the dissipation heat is effectively removed, as seen in FIG. 5.

A homogenization of the diode-laser pump radiation can be realized by focusing it into a planar wave-guide, with the exit end of the wave-guide being imaged into the amplification medium by way of imaging optics. The cross-section of the planar wave-guide is oriented in such a way that its large dimension is along the x-direction.

In another aspect, the present invention relates to an optical amplifier apparatus including an amplification medium that has an approximately rectangular cross-section with a long edge and a short edge as well as at least two highly reflective mirrors, the amplification medium being arranged between the latter. The long edge or the short edge of the cross-section is disposed along the x-axis or the y-axis, with the z-axis being the optical axis. (The x-, y- and z-axes constitute a rectangular system of coordinates). The mirrors are designed and arranged in such a way that a beam, which is to be amplified, is emitted by an oscillator and passes through the amplification medium in the xz-plane several times and becomes amplified. A hybrid resonator is formed that is unstable in the x-direction and stable in the y-direction and for which the input beam is injected in the amplification medium off axis, while the two highly reflective mirrors are dimensioned accordingly so that the resonator in the yz-plane is stable with the involvement of the thermal lens effect in that plane.

In still another aspect, the present invention relates to a laser oscillator with an amplification medium that has an approximately rectangular cross-section with a long edge and a short edge as well as at least two highly reflective mirrors, the amplification medium being arranged between the latter. The long edge or the short edge of the cross-section is disposed along the x-axis or the y-axis, with the z-axis being the optical axis. (The, and the x-, y- and z-axes constitute a rectangular system of coordinates.) The mirrors are designed and arranged in such a way that a multi-pass resonator is created and a hybrid resonator is formed, which is unstable in the x-direction and stable in the y-direction; and the two highly reflective mirrors are dimensioned accordingly so that the resonator in the yz-plane is stable with the involvement of the thermal lens effect in that plane. The resonator is designed in such a way that a laser oscillation takes place. More specifically, the connecting line of the curvature centers of the two mirrors is within the amplification zone that is enclosed by the reflecting mirror ranges.

In the described optical amplifier apparatus or the laser oscillator, the resonator is preferably stable in the yz-plane exclusively due to the thermal lens effect.

The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. Optical amplifier apparatus comprising:
   an amplification medium that has an approximately rectangular cross-section with a long edge and a short edge,
   at least two highly reflective mirrors, wherein the amplification medium is arranged between the at least two highly reflective mirrors,
   wherein the long edge or the short edge of the cross-section is along the x-axis or the y-axis, and the z-axis is the optical axis, and wherein the x-, y- and z-axes constitute a rectangular system of coordinates,
   wherein the mirrors are designed and arranged in such a way that a beam that is to be amplified, emitted in by an oscillator, passes through the amplification medium in the xy-plane several times and becomes amplified,
   wherein the dimension of the beam expands in the x-direction after each passage through, and
   wherein the resonator is stable in the yz-plane due to a cylindrical lens effect.

2. The optical amplifier apparatus as claimed in claim 1, wherein the dimension of the input beam expands by a constant factor in the x-direction after each passage through.

3. The optical amplifier apparatus as claimed in claim 1, wherein:
   the at least two mirrors are planar mirrors; and
   the mirrors are arranged at an angle $\beta$ relative to each other which is approximately equal to a full divergence angle $\alpha$ of the input beam.

4. The optical amplifier apparatus as claimed in claim 1, wherein the at least two mirrors are configured and disposed such as to form a hybrid resonator that is unstable in the x-direction and stable in the y-direction; and
   the input beam is injected in the amplification medium off axis.

5. The optical amplifier apparatus as claimed in claim 1, wherein
   the two mirrors are cylindrical mirrors with curvatures in the xz-plane; and
   the resonator is stable in the yz-plane due to a thermal lens effect in this plane.

6. The optical amplifier apparatus as claimed in claim 1, wherein the at least two mirrors have a joint focus F in the xz-plane and form a confocal unstable resonator.

7. The optical amplifier apparatus as claimed in claim 1, wherein the joint focus is located outside of the resonator.

8. The optical amplifier apparatus as claimed in claim 1, further comprising at least one lens arranged inside the resonator for beam formation or beam path and mode volume configuration.

9. The optical amplifier apparatus as claimed in claim 1, wherein at least one of the lenses arranged in the resonator is cylindrical in the yz-plane.

10. The optical amplifier apparatus as claimed in claim 1, further comprising means for transforming the input beam before injection in the amplification medium such that a characteristic curve thereof corresponds to a transversal mode of the stable resonator in the yz-plane.

11. The optical amplifier apparatus as claimed in claim 1, wherein a waist of the input beam is in the joint focus of the two mirrors.

12. The optical amplifier apparatus as claimed in claim 1, wherein the amplification medium is a gas medium.

13. The optical amplifier apparatus as claimed in claim 1, wherein the amplification medium is a solid-state medium.

14. The optical amplifier apparatus as claimed in claim 1, wherein the solid-state medium has a sandwich structure with at least one doped medium area and two undoped edge areas.

15. The optical amplifier apparatus as claimed in claim 1, wherein the solid-state medium is optically pumped.

16. The optical amplifier apparatus as claimed in claim 1, wherein the solid-state medium is pumped using diode lasers.

17. The optical amplifier apparatus as claimed in claim 1, wherein the solid-state medium is pumped at least through one end surface, substantially parallel to the z-axis.

18. The optical amplifier apparatus as claimed in claim 1, wherein the solid-state medium is pumped at least through one side surface, substantially perpendicular to the z-axis.

19. The optical amplifier apparatus as claimed in claim 1, wherein the solid-state medium has a flat, pumped channel with a rectangular cross-section whose dimension in the y-direction is smaller than a dimension of the doped solid-state medium.

20. The optical amplifier apparatus as claimed in claim 1, further comprising at least one optical pump source is arranged such that an approximately homogeneous pump power distribution in present in the xy-plane.

21. The optical amplifier apparatus as claimed in claim 1 with a planar wave-guide for homogenizing pump radiation with regard to the intensity in the xy-plane.

22. Optical amplifier apparatus comprising:
an amplification medium that has an approximately rectangular cross-section with a long edge and a short edge,
at least two highly reflective mirrors, wherein the amplification medium is arranged between the at least two highly reflective mirrors,
wherein the long edge or the short edge of the cross-section is along the x-axis or the y-axis, and the z-axis is the optical axis, and wherein the x-, y- and z-axes constitute a rectangular system of coordinates,
wherein the mirrors are designed and arranged in such a way that a beam that is to be amplified, emitted in by an oscillator, passes through the amplification medium in the xy-plane several times and becomes amplified,
wherein the dimension of the beam expands in the x-direction after each passage through, and
wherein the resonator is stable in the yz-plane as a result of a thermal lens effect in this plane.

23. The optical amplifier apparatus as claimed in claim 22, wherein the dimension of the input beam expands by a constant factor in the x-direction after each passage through.

24. The optical amplifier apparatus as claimed in claim 22, wherein
the at least two mirrors are planar mirrors; and
the mirrors are arranged at an angle β relative to each other which is approximately equal to a full divergence angle α of the input beam.

25. The optical amplifier apparatus as claimed in claim 22, wherein the at least two mirrors are configured and disposed such as to form a hybrid resonator that is unstable in the x-direction and stable in the y-direction; and the input beam is injected in the amplification medium off axis.

26. The optical amplifier apparatus as claimed in claim 22, wherein:
the two mirrors are cylindrical mirrors with curvatures in the xz-plane; and
the resonator is stable in the yz-plane due to a thermal lens effect in this plane.

27. The optical amplifier apparatus as claimed in claim 22, wherein the at least two mirrors have a joint focus F in the xz-plane and form a confocal unstable resonator.

28. The optical amplifier apparatus as claimed in claim 22, wherein the joint focus is located outside of the resonator.

29. The optical amplifier apparatus as claimed in claim 22, further comprising at least one lens arranged inside the resonator for beam formation or beam path and mode volume configuration.

30. The optical amplifier apparatus as claimed in claim 22, wherein at least one of the lenses arranged in the resonator is cylindrical in the yz-plane.

31. The optical amplifier apparatus as claimed in claim 22, further comprising means for transforming the input beam before injection in the amplification medium such that a characteristic curve thereof corresponds to a transversal mode of the stable-resonator in the yz-plane.

32. The optical amplifier apparatus as claimed in claim 22, wherein a waist of the input beam is in the joint focus of the two mirrors.

33. The optical amplifier apparatus as claimed in claim 22, wherein the amplification medium is a gas medium.

34. The optical amplifier apparatus as claimed in claim 22, wherein the amplification medium is a solid-state medium.

35. The optical amplifier apparatus as claimed in claim 22, wherein the solid-state medium has a sandwich structure with at least one doped medium area and two undoped edge areas.

36. The optical amplifier apparatus as claimed in claim 22, wherein the solid-state medium is optically pumped.

37. The optical amplifier apparatus as claimed in claim 22, wherein the solid-state medium is pumped using diode lasers.

38. The optical amplifier apparatus as claimed in claim 22, wherein the solid-state medium is pumped at least through one end surface, substantially parallel to the z-axis.

39. The optical amplifier apparatus as claimed in claim 22, wherein the solid-state medium is pumped at least through one side surface, substantially perpendicular to the z-axis.

40. The optical amplifier apparatus as claimed in claim 22, wherein the solid-state medium has a flat, pumped channel with a rectangular cross-section whose dimension in the y-direction is smaller than a dimension of the doped solid-state medium.

41. The optical amplifier apparatus as claimed in claim 22, further comprising at least one optical pump source is arranged such that an approximately homogeneous pump power distribution in present in the xy-plane.

42. The optical amplifier apparatus as claimed in claim 22 with a planar wave-guide for homogenizing pump radiation with regard to the intensity in the xy-plane.

* * * * *